United States Patent
Imaizumi (10) Patent No.: US 7,586,518 B2
(45) Date of Patent: Sep. 8, 2009

(54) IMAGING TECHNIQUE PERFORMING FOCUSING ON PLURALITY OF IMAGES

(75) Inventor: Kazuhiro Imaizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 646 days.

(21) Appl. No.: 11/146,947

(22) Filed: Jun. 7, 2005

(65) Prior Publication Data

US 2005/0280733 A1 Dec. 22, 2005

(30) Foreign Application Priority Data

Jun. 18, 2004 (JP) ............................. 2004-181074

(51) Int. Cl.
*H04N 5/228* (2006.01)
(52) U.S. Cl. .................. 348/208.12; 348/345; 348/352
(58) Field of Classification Search ............ 348/208.12, 348/352, 367, 216.1, 217.1, 355
See application file for complete search history.

(56) References Cited

U.S. PATENT DOCUMENTS

| 5,907,353 A | * | 5/1999 | Okauchi | 348/218.1 |
| 6,556,246 B1 | * | 4/2003 | Suda | 348/352 |
| 2003/0214600 A1 | * | 11/2003 | Kido | 348/362 |

FOREIGN PATENT DOCUMENTS

JP 5-7336 A 1/1993

* cited by examiner

*Primary Examiner*—Sinh Tran
*Assistant Examiner*—Paul Berardesca
(74) *Attorney, Agent, or Firm*—Canon USA Inc IP Div (57) ABSTRACT

A focusing technique detects motion vectors of a plurality of images, combines the images in accordance with the detected motion vectors, extracts a signal corresponding to a focusing state of a lens unit with respect to a subject, and controls the lens unit in accordance with the extracted signal to perform focusing.

7 Claims, 6 Drawing Sheets

--Prior Art--

IMAGING TECHNIQUE PERFORMING FOCUSING ON PLURALITY OF IMAGES

BACKGROUND OF THE INVENTION

1. Field of the Invention

The present invention relates to an imaging technique and in particular, to an imaging technique performing focusing.

2. Description of the Related Art

Digital video cameras, or digital camcorders, which form an image of a subject on a semiconductor imaging device, such as a two-dimensional charge-coupled device (CCD) image sensor, by means of an optical imaging system, convert the image into an electrical signal, and record image data of moving images obtained on a record medium, such as a semiconductor memory, a magnetic disk, or a magnetic tape, and digital still cameras capable of recording moving images in addition to still images are becoming popular. For current digital video cameras and digital still cameras, all important tasks in image capturing, such as exposure settings, focusing, and the like, are automated, so that even users who are inexperienced at camera operations seldom fail to capture images properly.

CCD image sensors, as mentioned above, have the electronic shutter capability that allows a user to freely set a shutter speed. Therefore, a user can adjust the exposure time in accordance with the motion of a subject or illumination conditions. For example, for capturing a moving image of a subject in dark conditions, due to the low illumination, a user selects a low speed setting so as to make an electronic shutter speed lower in order to have an increased exposure. This shutter speed is slower than a normal shutter speed of $1/60$ second in one field of a video signal, for example, $1/30$ sec. or $1/15$ sec. However, slow shutter speeds cause image capturing to be susceptible to the effects of camera shaking, and therefore, an image of a subject is blurred. To prevent this, a method is proposed in which an image capturing operation with an exposure time that does not cause motion blurring is performed multiple times and the obtained images are combined while their displacements are corrected, thereby realizing a resulting image with a long exposure time (see, for example, Japanese Patent No. 3110797).

Japanese Patent No. 3110797 discloses an apparatus for combining captured images. The apparatus includes a detecting unit for detecting information regarding motion between a plurality of images and an image moving unit for transforming the positions of the plurality of images in a plane coordinate system in accordance with the detected information. With the application of this technique, in a case when a moving image of a subject in dark conditions requiring a low-speed shutter setting for sufficient exposure is to be captured, an exposure time that does not cause an image to be affected by camera shaking, for example, a normal speed of $1/60$ sec. in one field of a video signal is set, instead of a normal low-speed shutter setting of $1/30$ sec., $1/15$ sec., or a slower time, an image capturing operation is performed multiple times in units of $1/60$ sec. for a period of time equal to an exposure period of a low-speed shutter, and the plurality of images obtained are combined, so that moving images that have exposure amounts equal to that of a low-speed shutter and that are not affected by camera shaking can be acquired in units of the same time period as an exposure time of the low-speed shutter.

However, the method for setting an exposure time that does not cause an image to be affected by camera shaking, instead of selecting a low-speed shutter setting, for capturing an image multiple times in a period of time equal to an exposure period of a low-speed shutter, and for combining the plurality of images captured in order to acquire moving images that do not suffer the effects of camera shaking and that have the same exposure as that of the low-speed shutter setting, as described above, significantly affects a focus performance in an automatic focusing unit. Specifically, a normal focusing unit for processing moving images performs focusing by a method (so-called "television autofocus (TV-AF) method") for extracting a definition signal for focusing from a signal obtained from a signal output from an imaging device every image capturing in accordance with a focusing state of the lens unit and controlling a lens unit using the definition signal such that, for example, the amount of definition signal is maximized. However, when a moving image of a subject in dark conditions, due to the low illumination, is captured, an amplitude of a signal output from the imaging device at intervals of multiple image capturing operations is too small, and as a result, an amplitude of a definition signal for focusing obtained from the imaging device is too small. In other words, the obtained signal is inadequate to realize a sufficient focus performance (low-contrast conditions).

Figure 4:
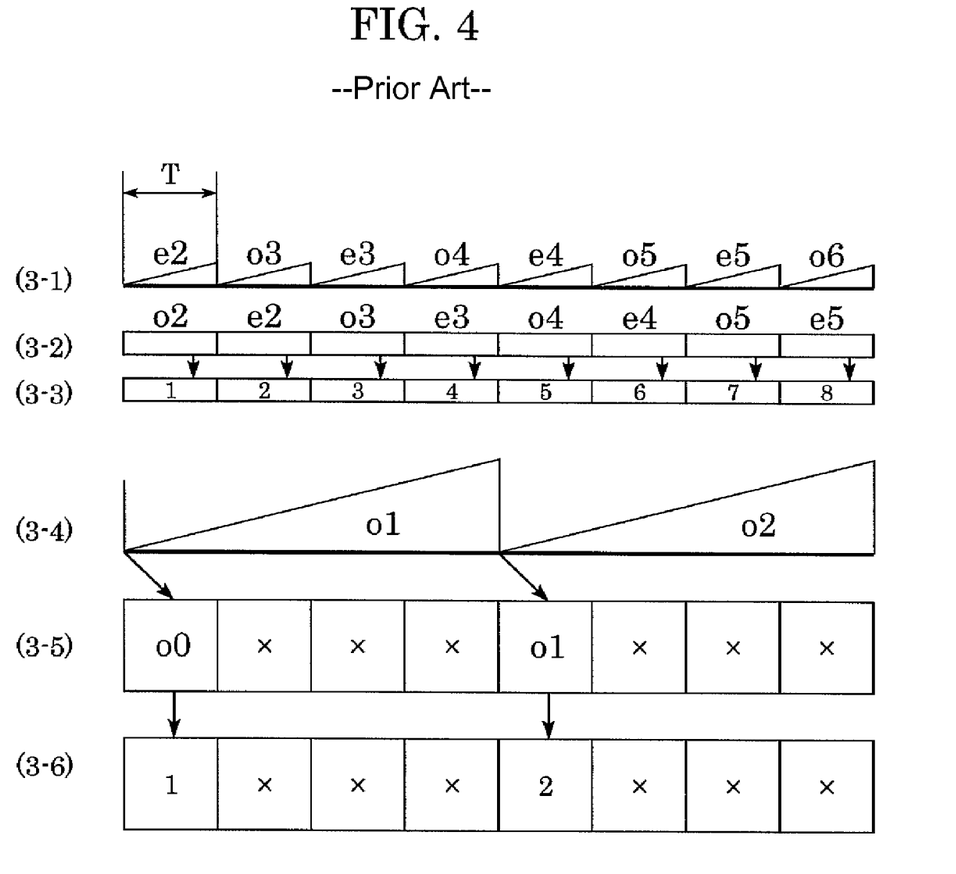
FIG. 4 is a timing chart showing an amplitude of a definition signal in a known art.

FIG. 4 shows the amount of signal stored in the imaging device, the amount of signal output from the imaging device, and the amplitude of the definition signal obtained from the output from the imaging device in this case. In FIG. 4, chart (3-1) represents the relationship between the amount of signal stored in the imaging device and an exposure period. Reference numerals e2, o3, e3, . . . individually represent repeat numbers of even or odd fields in the exposure period in the imaging device. Since a resulting moving image is not affected by camera shaking and has an exposure equal to that of a low-speed shutter setting due to processing of an image combining unit disposed at a subsequent stage even when an image of a subject in the dark is captured, an exposure period, T, is set to the order of $1/60$ sec., and thus a signal is read every $1/60$ sec., as shown in chart (3-2). Combining signals of four reading operations realizes an image (composite image) with an exposure equal to an exposure time of $1/15$ sec. of a low-speed shutter setting. However, the amount of definition signal extracted is small in accordance with the amount of signal stored in the imaging device, as shown in chart (3-3), and therefore, the extracted definition signal is inadequate to realize a sufficient focus performance.

Charts (3-4), (3-5), and (3-6) represent the amount of signal stored in the imaging device, the amount of signal output from the imaging device, and the amplitude of the definition signal obtained from the output from the imaging device, respectively, when a normal low-speed shutter setting of $1/15$ sec. is selected as an exposure period. In this case, although the amplitude of the definition signal is large, the output from the imaging device, i.e., the definition signal has many remaining components leading to poor contrast because of a long exposure. This causes degradation in focus performance.

If, for example, image combining processing, as described above, is not performed, in a case when an image of a subject in the dark is captured, an amplitude of the definition signal can be amplified by increasing the gain of a signal that is output from the imaging device every a normal speed of $1/60$ sec. in one field of a video signal and that has a small amplitude, thus realizing an image with contrast, albeit with much noise. However, since this method amplifies the amplitude of a signal output from the imaging device and increases an apparent exposure, a high-quality moving image with less noise is not acquired.

SUMMARY OF THE INVENTION

The present invention provides a technique capable of preventing degradation in focus performance of an autofocus operation when acquiring moving images with no effect of camera shaking by a method for combining a plurality of images.

According to a first aspect of the present invention, an imaging apparatus includes a solid-state imaging unit, a detecting unit, a combining unit, an extracting unit, and a focus controlling unit. The solid-state imaging unit is configured to receive an image of a subject formed through a lens unit configured to perform focusing and to output an image signal composed of a plurality of continuous images. The detecting unit is configured to detect a motion vector of each of the plurality of images. The combining unit is configured to combine the plurality of images in accordance with each motion vector detected by the detecting unit to produce a composite image. The extracting unit configured to extract a first signal corresponding to a focusing state of the lens unit with respect to the subject in accordance with the composite image. The focus controlling unit configured to control the lens unit in accordance with the extracted first signal to perform focusing.

Correcting displacement components of a plurality of continuous images and combining the images suppress the effects of camera shaking when a moving image is captured with a low-speed shutter setting, thus improving precision of the captured moving image. Additionally, extracting a definition signal from a composite image and performing focusing using the definition signal enhance a focus performance when a moving image of a subject in dark conditions, due to the low illumination, is captured.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The embodiments of the present invention are described below with reference to the drawings.

Figure 1:
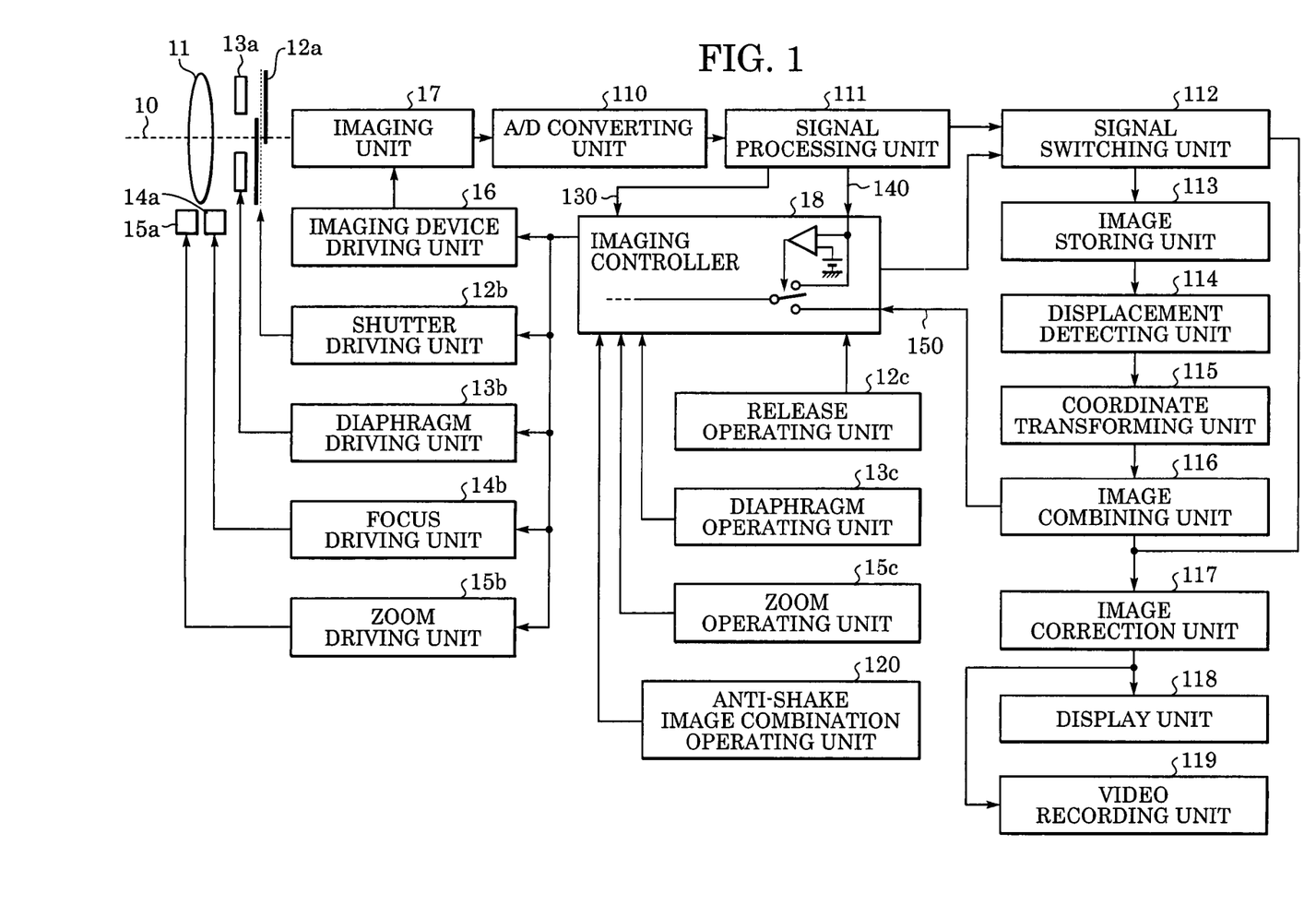
FIG. 1 is a block diagram of a digital video camera according to at least one exemplary embodiment of the present invention.

FIG. 1 shows an example of a digital video camera according to at least one exemplary embodiment of the present invention. A beam (image capture light beam) incident from an imaging lens 11 passes through a diaphragm 13a, and the amount of light is adjusted. The beam then passes through a shutter 12a, and an image is formed in an imaging unit 17. The imaging unit 17 is composed of a two-dimensional image sensor, such as a CCD.

The imaging lens 11 is composed of a plurality of optical lens groups. These lens groups in whole or in part move along an optical axis 10 with a driving force supplied from an autofocus (AF) driving motor 14a and perform focusing by stopping at a predetermined in-focus position. The AF driving motor 14a is driven by receiving a driving signal from a focus driving unit 14b. Some of the optical lens groups of the imaging lens 11 move along the optical axis 10 with a driving force from a zoom driving motor 15a and change an angle of view in image capturing by stopping at a predetermined zoom position. The zoom driving motor 15a is driven by receiving a driving signal from a zoom driving unit 15b.

The diaphragm 13a includes a plurality of diaphragm blades. The diaphragm blades are actuated by receiving a driving force from a diaphragm driving unit 13b so as to change an area (diameter) of an aperture through which light beams pass. The shutter 12a includes a plurality of shutter blades. The shutter blades are actuated by receiving a driving force from a shutter driving unit 12b so as to open or close an aperture though which light beams pass. As a result, the amount of light entering the imaging unit 17 is controlled. The shutter 12a is used when a still picture is captured with the digital video camera.

Driving an imaging device driving unit 16, the focus driving unit 14b, the zoom driving unit 15b, the diaphragm driving unit 13b, and the shutter driving unit 12b are controlled by an imaging controller 18. The imaging controller 18 can receive operation signals from a diaphragm operating unit 13c, a zoom operating unit 15c, and an anti-shake image combination operating unit 120, which is described below, and supply the operation signals to the imaging device driving unit 16, the focus driving unit 14b, the zoom driving unit 15b, the diaphragm driving unit 13b, and the shutter driving unit 12b in accordance with image capturing conditions so as to determine image capturing settings so that an image capturing operation is carried out. The diaphragm operating unit 13c is not used in normal image capturing since the aperture diameter of the diaphragm 13a is automatically set in a camera section when an image is captured. However, the diaphragm operating unit 13c is provided in order that a user can optionally determine an image capturing setting.

The imaging controller 18 measures the subject brightness (performs metering) using a metering signal 130 based on an image signal captured in a signal processing unit 111, which is described below. In accordance with the obtained measurement, the aperture diameter of the diaphragm 13a and an electronic shutter timing (exposure time) of the imaging device driving unit 16 are determined.

A video (image) signal output from the imaging unit 17 is converted from analog to digital form by an analog-to-digital (A/D) converting unit 110 and input to the signal processing unit 111. The signal processing unit 111 performs signal processing, such as formation of luminance signals and color signals, on an input signal, so as to create a video signal for color moving images.

A video signal subjected to signal processing in the signal processing unit 111 is input to an image correction unit 117 via a signal switching unit 112. The image correction unit 117 performs gamma correction, compression, and the like on an input signal.

A signal output from the image correction unit 117 is input to a display unit 118 and a video recording unit 119, so that a captured moving image is displayed on the display unit 118 and recorded in the video recording unit 119.

Figure 3:
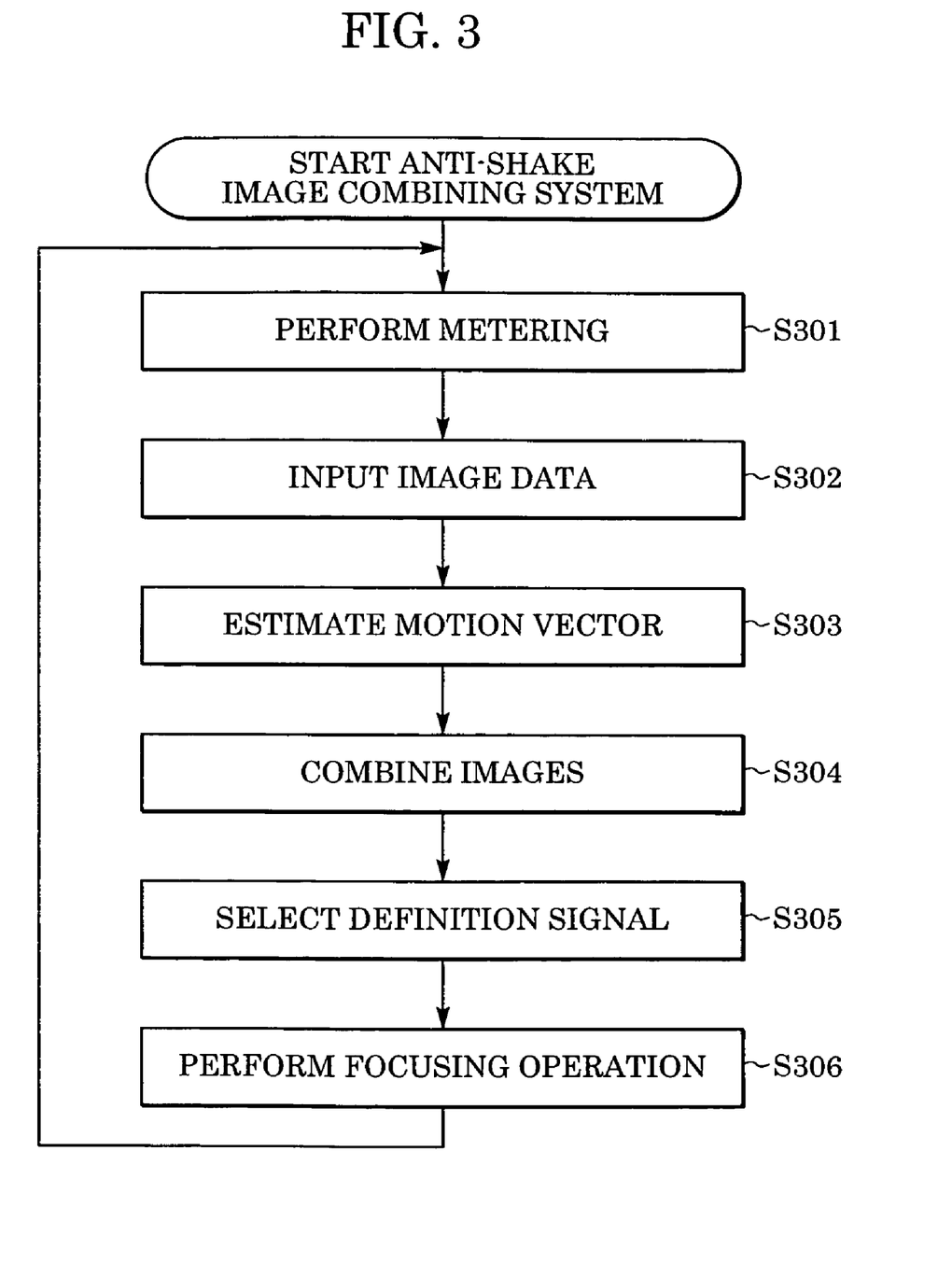
FIG. 3 is a flowchart for control when an anti-shake image combining system is activated according to an embodiment.

In the process described above, for a subject to be captured is in dark conditions requiring a long exposure time, there is a possibility that a normal low-speed shutter setting causes image capturing to be affected by camera shaking. Therefore, a user operates the anti-shake image combination operating unit 120 so that an anti-shake image combining system is activated and the processing is switched to an operation described below, as shown in the flowchart of FIG. 3 performed by the imaging controller 18.

In step S301, metering is started. In accordance with the obtained measurement, an electronic-shutter timing (exposure time) of the imaging device driving unit 16 and the aperture diameter of the diaphragm 13a are set. In normal settings, under the above-mentioned condition, in which the subject is in the dark, the diaphragm would be set so as to be fully open and the exposure time would be set so as to be long. In this embodiment, however, the long exposure time, which would be set in normal settings, is divided into a plurality of continuous short exposure time segments such that the total exposure produced by an add operation carried out in a method for combining a plurality of images, which is described later, is equal to the amount of exposure that would be obtained when a low-speed shutter setting is selected. Image capturing with divided short exposure time segments causes underexposure in a single image obtained, but it has little effect of camera shaking.

A plurality of continuous images are combined by add operations at the same intervals as a cycle of a low-speed shutter setting, so that resulting moving images with minimized effects of camera shaking and improved exposure are realized.

An image signal output from the imaging unit 17 is converted to a digital signal by the A/D converting unit 110 and is then subjected to signal processing by the signal processing unit 111. When the anti-shake image combining system is activated by an operation of the anti-shake image combination operating unit 120 and information indicating this reaches the imaging controller 18, image data from the signal processing unit 111 is input to an image storing unit 113 via the signal switching unit 112 (step S302). The image storing unit 113 includes a storing area with a storage capacity for storing a plurality of images corresponding to the number of division of exposure time, and stores a plurality of captured images of continuous video fields such that the stored images are overwritten in accordance with subsequent input image data. A displacement detecting unit 114 extracts a common feature point in the images stored in the image storing unit 113 and detects a motion vector of each of the continuous images by calculating the coordinates of the feature point present in a capturing screen (step S303). A coordinate transforming unit 115 corrects each of the differences (performs coordinate transformation) in accordance with the coordinates of the feature point in each of the images so that the positions of the feature points in the images are coincided with each other. Specifically, video images are sequentially moved by the magnitude of a detected motion vector in a direction opposite to the motion vector. Then, good video images in which displacements are corrected are combined by superposition in an image combining unit 116 (step S304). As a result, the effects of camera shaking produced in between the fields are corrected, so that good video signals are acquired.

At the same time, the imaging controller 18 calculates an in-focus position of the imaging lens 11 in accordance with a definition signal formed by being extracted from a second output 140 for definition signal extraction before image combination from the signal processing unit 111 or a first output 150 for definition signal extraction after image combination from the image combining unit 116 while driving the focus driving unit 14b.

The imaging controller 18 receives the second output 140, which is for definition signal extraction before image combination, from the signal processing unit 111 and the first output 150, which is for definition signal extraction after image combination, from the image combining unit 116. The imaging controller 18 compares an amplitude of a definition signal created from the second output 140 with a predetermined threshold. When the amplitude is smaller than the predetermined threshold, like in a case when an image of a subject in dark conditions is captured, the imaging controller 18 selects the first output 150 as a signal source for extracting a definition signal, not the second output 140 (step S305). In accordance with this selected output with a large amplitude, the imaging controller 18 performs an autofocusing operation using a hill-climbing method (contrast detection autofocusing) by generating an evaluation value of a frequency peak, an evaluation value of a brightness level peak, and an evaluation value of max-min data within a measuring frame whose position and size are determined for autofocusing (step S306).

Since the selection of a source for a definition signal includes an appropriate hysteresis with respect to a threshold, frequent occurrence of switching the source when the amplitude of the definition signal obtained from the second output 140 lies in a range around the threshold is suppressed.

Figure 2:
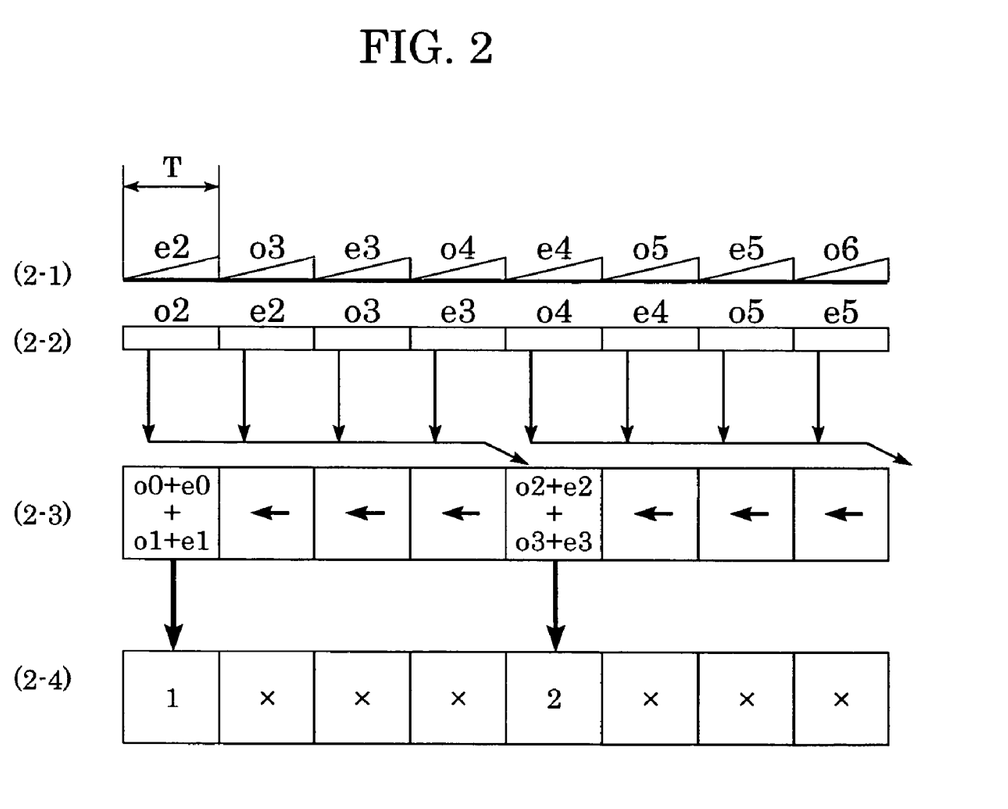
FIG. 2 is a timing chart showing an amplitude of a definition signal according to at least one exemplary embodiment of the present invention.

FIG. 2 shows the amount of signal stored in the imaging device, the amount of signal output from the imaging device, and the amplitude of the definition signal obtained from the output from the imaging device. In FIG. 2, chart (2-1) represents the relationship between the amount of signal stored in the imaging device and an exposure period. Reference numerals e2, o3, e3, . . . individually represent repeat numbers of even or odd fields in the exposure period in the imaging device. Since a resulting moving image is not affected by camera shaking and that has an exposure equal to that of a low-speed shutter setting due to processing of the image combining unit 116 disposed at a subsequent stage even when an image of a subject in the dark is captured, an exposure period, T, is set to the order of 1/60 sec. and thus a signal is read every 1/60 sec., as shown in chart (2-2). Combining signals of four reading operations realizes an image (composite image) with an exposure equal to an exposure time of 1/15 sec. of a low-speed shutter setting, as shown in chart (2-3). If the amplitude of a second definition signal is smaller than a predetermined value, a first definition signal is selected from a composite image after image combination and therefore the obtained definition signal has a large amplitude and a high signal-to-noise ratio. Thus, high-precision evaluation data for autofocusing is generated, as shown in chart (2-4).

As described above, this embodiment includes a lens unit (11) for performing focusing, a solid-state imaging unit (17) for receiving an image of a subject formed through the lens unit (11) and for outputting an image signal composed of a plurality of continuous images obtained by pressing an electronic shutter in succession, a detecting unit (114) for detecting a motion vector between an image of the plurality of images and the immediately preceding image with respect to each of the plurality of images, a combining unit (115, 116) for correcting a displacement of each image in accordance with the corresponding detected motion vector detected by the detecting unit (114) and for combining the images to produce a composite image, an extracting unit (116) for extracting a first definition signal (150) corresponding to a focusing state of the lens unit (11) with respect to the subject in accordance with the composite image, and a focus controlling unit (18, 14a, and 14b) for controlling the lens unit (11) in accordance with the extracted definition signal to perform focusing.

The extracting unit (111) extracts a second definition signal (140) corresponding to a focusing state of the lens unit (11) in accordance with an image before image combination. The focus controlling unit (18, 14a, and 14b) selects the second definition signal (140) based on the image before image combination or the first definition signal (150) based on the composite image after image combination, and controls the lens unit (11) in accordance with the selected definition signal to perform focusing.

The focus controlling unit (18) controls the lens unit (11) in accordance with the second definition signal (140) to perform focusing when an amplitude of the second signal (140) is larger than a threshold, and the focus controlling unit (18) controls the lens unit (11) in accordance with the first signal (150) to perform focusing when the amplitude of the second signal (140) is smaller than the threshold.

Correcting displacement components of a plurality of continuous images and combining the images suppress the effects of camera shaking when a moving image is captured with a low-speed shutter setting, thus improving precision of the captured moving image. Additionally, extracting a definition signal from a composite image and performing focusing using the definition signal enhance a focus performance when a moving image of a subject in dark conditions, due to the low illumination, is captured.

An imaging apparatus capable of acquiring a moving image with an exposure equal to that of a low-speed shutter setting and with no effect of camera shaking by a method for combining a plurality of images includes an extracting unit for extracting a definition signal for focusing from a composite image after video images are corrected and combined by superposition, in order to prevent degradation in focus performance of an autofocuing unit.

According to this embodiment, a definition signal for focusing can be extracted from a composite image after video images are corrected and combined by superposition. Therefore, when a moving image of a subject in dark conditions, due to the low illumination, is capture, focusing control using a TV-AF method with a composite image that is corrected so as not to be affected by camera shaking and that has an increased signal amplitude and an improved contrast can be realized, and as a result, a focus performance higher than conventional methods can be realized. Additionally, when a moving image is captured with a low-speed shutter setting, the effects of camera shaking are corrected, thus improving precision of captured moving images.

A second embodiment according to a technique for realizing an appropriate focus performance even when an obtained signal is inadequate to attain a sufficient focus performance (low-contrast conditions) is described below. Like the first embodiment described above, the second embodiment can realize an appropriate focus performance when a moving image of a subject in dark conditions, due to the low illumination, is captured and an amplitude of a definition signal for focusing obtained from the imaging device is small.

The second embodiment has the structure of the digital video camera shown in FIG. 1. This embodiment differs from the first embodiment in the timing of extracting the definition signal and the usage of the extracted definition signal. This embodiment is described below with reference to the flowchart of FIG. 5, which is controlled by the imaging controller 18.

Figure 5:
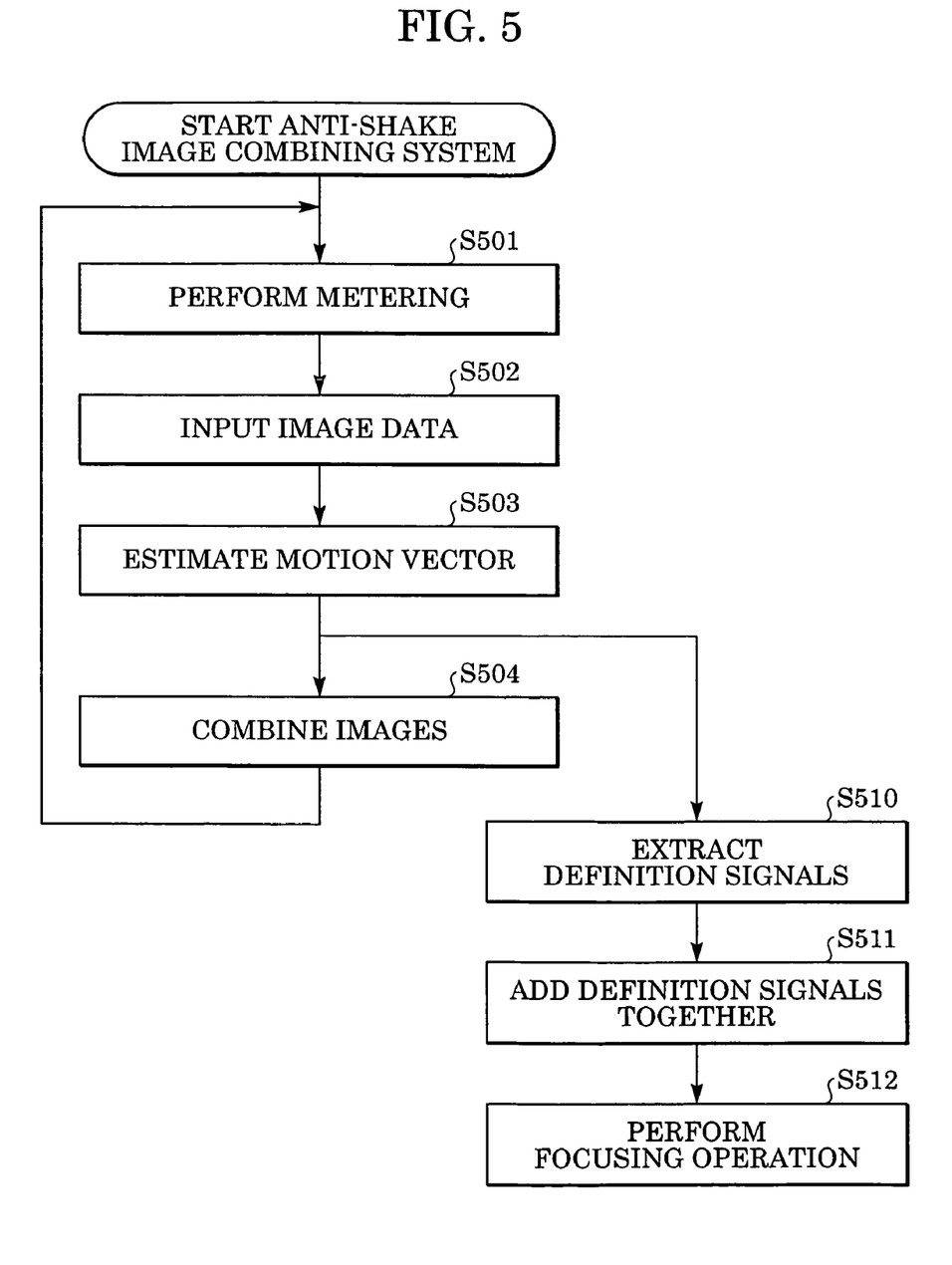
FIG. 5 is a flowchart for control when the anti-shake image combining system is activated according to another embodiment.

In step S501, metering is started, as in the case of step S301 of FIG. 3. In accordance with the obtained measurement, an electronic-shutter timing (exposure time) of the imaging device driving unit 16 and the aperture diameter of the diaphragm 13a are set. In normal settings, under the condition in which a subject is in the dark, the diaphragm would be set so as to be fully open and the exposure time would be set so as to be long. In the second embodiment, however, the exposure is controlled by the method for combining a plurality of images, which is described above, as in the case with the first embodiment. This causes underexposure in a single image obtained.

An image signal output from the imaging unit 17 is converted to a digital signal by the A/D converting unit 110 and is then subjected to signal processing by the signal processing unit 111. In step S502, as in the case of step S302, when the anti-shake image combining system is activated by an operation of the anti-shake image combination operating unit 120 and information indicating this reaches the imaging controller 18, image data from the signal processing unit 111 is input to the image storing unit 113 via the signal switching unit 112.

In step S503, as in the case of step S303, the displacement detecting unit 114 extracts a common feature point in the images stored in the image storing unit 113 and detects a motion vector of each of the continuous images by calculating the coordinates of the feature point present in a capturing screen. The coordinate transforming unit 115 corrects each of the differences (performs coordinate transformation) in accordance with the coordinates of the feature point in each of the images so that the positions of the feature points in the images are coincided with each other. Specifically, video images are sequentially moved by the magnitude of a detected motion vector in a direction opposite to the motion vector. Then, good video images in which displacements are corrected are combined by superposition in the image combining unit 116 (step S504). As a result, the effects of camera shaking produced in between the fields are corrected, so that good video signals are acquired.

At the same time, according to the second embodiment, the imaging controller 18 extracts definition signals from the second output 140, which is for definition signal extraction before image combination, from the signal processing unit 111 while driving the focus driving unit 14b (step S510).

Since the brightness level of the obtained image is low, the level of a single definition signal extracted is low. In step S511, the definition signals are added together in accordance with the image combination in step S504 to produce a composite definition signal. In this case, the definition signals are added together in accordance with the number of division of the exposure time so that the resulting composite definition signal attains a high level. In accordance with the composite definition signal, an autofocusing operation using the hill-climbing method (contrast detection autofocusing) is performed (step S512).

The extraction of each of the definition signals in step S510 may be controlled so that an extraction area for the definition signal is controlled in accordance with the result of the detection of the motion vector in step S503. Specifically, the extraction area for the definition signal in a video signal is moved in accordance with the detected motion vector, so that the definition signal is extracted from the extraction area corresponding to the images to be combined in step S504.

As described above, extracting the definition signals from a video signal prepared before the images are combined and adding the extracted definition signals together improves a focus performance when a moving image of a subject in dark conditions, due to the low illumination, is captured.

Figure 6:
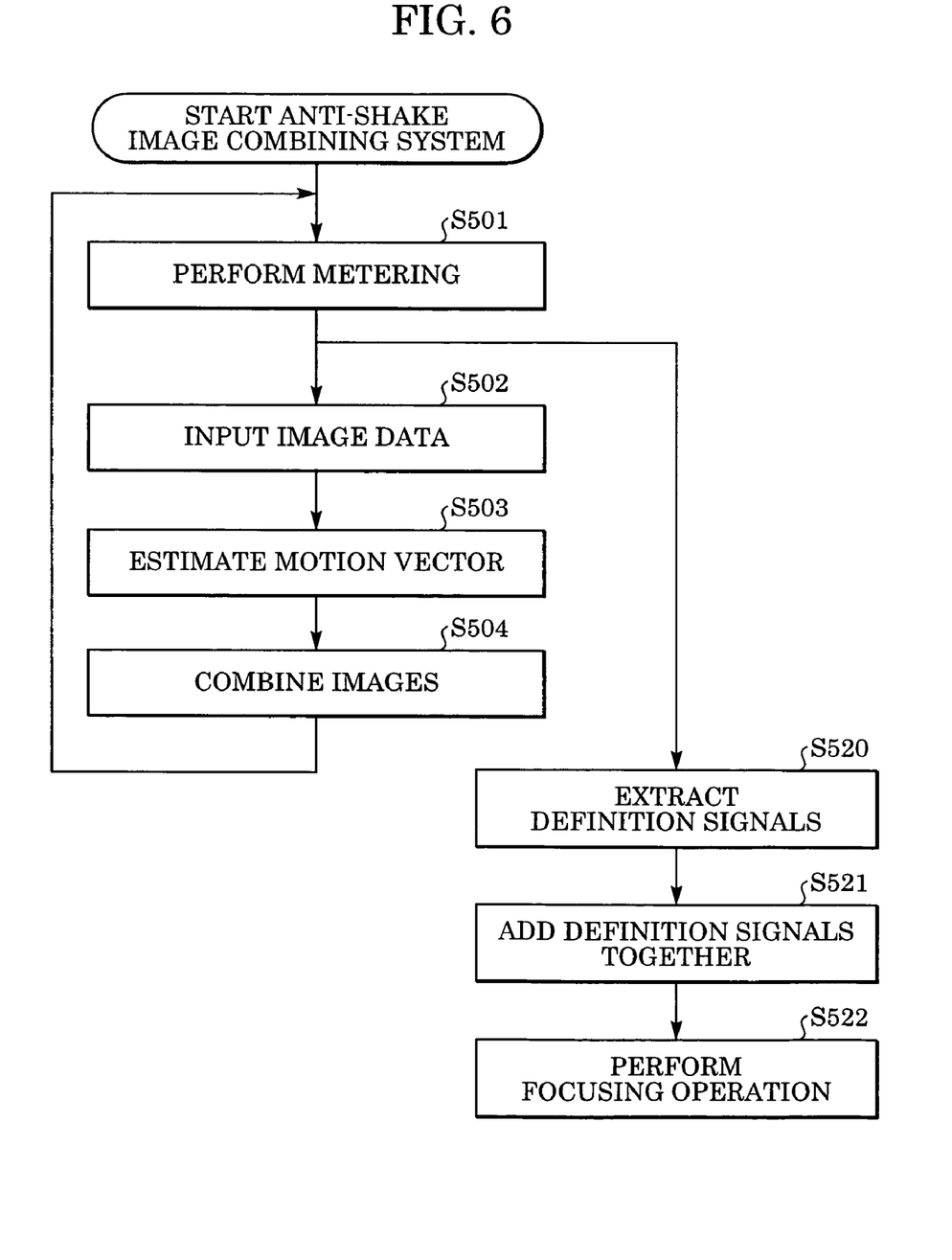
FIG. 6 is a flowchart for control when the anti-shake image combining system is activated according to still another embodiment.

In the flowchart of FIG. 5, after the motion vector is detected in step S503, the definition signals are extracted in step S510. However, as shown in FIG. 6, the definition signals may be extracted (step S520) in parallel with the detection of the motion vector and the extracted definition signals may be added together (step S521) before the focusing operation is performed (step S522). In this case, moving the extraction area for each of the definition signals in accordance with the detected motion vector cannot be performed, unlike the second embodiment described above. However, a focus performance when a moving image of a subject in dark conditions, due to the low illumination, is captured is improved by extracting the definition signals from a video signal prepared before the images are combined and adding the extracted definition signals together.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-181074 filed Jun. 18, 2004, which is hereby incorporated by reference herein.

What is claimed is:

1. An imaging apparatus comprising:
   a solid-state imaging unit configured to receive an image of a subject formed through a lens unit configured to perform focusing and to output an image signal composed of a plurality of continuous images;
   a detecting unit configured to detect a motion vector of each of the plurality of images;
   a combining unit configured to combine the plurality of images in accordance with each motion vector detected by the detecting unit to produce a composite image;
   an extracting unit capable of extracting a first signal corresponding to a focusing state of the lens unit from the combined image, and a second signal corresponding to a focusing state of the lens unit with respect to a subject from the plurality of images before being combined; and
   a focus controlling unit configured to control the lens unit in accordance with the extracted first signal and the second signal to perform focusing.

2. The imaging apparatus according to claim 1, wherein the extracting unit extracts a second signal corresponding to a focusing state of the lens unit with respect to the subject in accordance with the images before being combined, and the focus controlling unit selects the second signal or the first signal.

3. The imaging apparatus according to claim 1, wherein the focus controlling unit controls the lens unit in accordance with the second signal to perform focusing when an amplitude of the second signal is larger than a threshold, and the focus controlling unit controls the lens unit in accordance with the first signal to perform focusing when the amplitude of the second signal is smaller than the threshold.

4. The imaging apparatus according to claim 1, further comprising:
   a storing unit configured to store the image signal composed of the plurality of images output from the solid-state imaging unit,
   wherein the combining unit combines the plurality of images after correcting a displacement of each of the plurality of images stored in the storing unit.

5. A method for controlling an imaging apparatus including a solid-state imaging unit configured to receive an image of a subject formed through a lens unit for performing focusing and to output an image signal composed of a plurality of continuous images, the method comprising:
   a detecting step of detecting a motion vector of each of the plurality of images;
   a combining step of combining the plurality of images in accordance with each motion vector detected in the detecting step to produce a composite image;
   an extracting step of extracting a first signal corresponding to a focusing state of the lens unit, wherein the first signal is generated from the composite image; and
   a focus controlling step of controlling the lens unit in accordance with the extracted first signal to perform focusing.

6. An imaging apparatus comprising:
   a solid-state imaging unit configured to receive an image of a subject formed through a lens unit configured to perform focusing and to output an image signal composed of a plurality of continuous images;
   a combining unit configured to combine the plurality of images in accordance with a motion vector of the plurality of images;
   an extracting unit configured to extract first signals corresponding to a focusing state of the lens unit with respect to the subject from a signal prepared before the images are combined and configured to add the extracted first signals together so as to produce a second signal, wherein the first signal is generated from the plurality of images before becoming combined; and
   a focus controlling unit configured to control the lens unit in accordance with the second signal to perform focusing.

7. A method for controlling an imaging apparatus including a solid-state imaging unit configured to receive an image of a subject formed through a lens unit for performing focusing and to output an image signal composed of a plurality of continuous images, the method comprising:
   a combining step of combining the plurality of images in accordance with a motion vector of the plurality of images;
   an extracting step of extracting first signals corresponding to a focusing state of the lens unit with respect to the subject from a signal prepared before the images are combined and of adding the extracted first signals together to produce a second signal, wherein the first signal is generated from the plurality of images before becoming combined; and
   a focus controlling step of controlling the lens unit in accordance with the second signal to perform focusing.

* * * * *